(12) United States Patent
Sagi et al.

(10) Patent No.: US 9,915,243 B2
(45) Date of Patent: Mar. 13, 2018

(54) SYSTEM AND METHOD FOR AUTOMATIC GENERATION CONTROL IN WIND FARMS (71) Applicant: General Electric Company, Schenectady, NY (US)

(72) Inventors: Deepak Raj Sagi, Bangalore (IN); Mark Edward Cardinal, Altamont, NY (US); Avijit Saha, Bangalore (IN); Rajni Kant Burra, Bangalore (IN); Govardhan Ganireddy, Bangalore (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 309 days.

(21) Appl. No.: 14/625,108

(22) Filed: Feb. 18, 2015

(65) Prior Publication Data

US 2015/0240784 A1    Aug. 27, 2015

(30) Foreign Application Priority Data

Feb. 24, 2014   (IN) .............................. 919/CHE/2014

(51) Int. Cl.
| F03D 7/04 | (2006.01) |
| G05B 15/02 | (2006.01) |
| F03D 9/25 | (2016.01) |

(52) U.S. Cl.
CPC ............. *F03D 7/048* (2013.01); *F03D 9/257* (2017.02); *G05B 15/02* (2013.01);
(Continued)

(58) Field of Classification Search
None
See application file for complete search history.

(56) References Cited

U.S. PATENT DOCUMENTS

| 7,345,373 B2 | 3/2008 | Delmerico et al. |
| 7,372,173 B2 | 5/2008 | Lutze et al. |

(Continued)

FOREIGN PATENT DOCUMENTS

| EP | 2110549 A2 | 10/2009 |
| EP | 2573896 A1 | 3/2013 |
| WO | 2012171532 A2 | 12/2012 |

OTHER PUBLICATIONS

Jeevithavenkatachalam, Automatic generation control of two area interconnected power system using particle swarm optimization, In: IOSR Journal of Electrical and Electronics Engineering (IOSR-JEEE), May 2103.*

(Continued)

*Primary Examiner* — William B Partridge
*Assistant Examiner* — Istiaque Ahmed
(74) *Attorney, Agent, or Firm* — Douglas D. Zhang; GE Global Patent Operation (57) ABSTRACT

A system for automatic generation control in a wind farm is provided. The system includes a wind farm controller for controlling the plurality of energy storage elements. The wind farm controller receives an automatic generation control set point from an independent system operator, generates a farm-level storage power set point for the wind farm based on the automatic generation control set point, generates individual storage power set points for the plurality of energy storage elements based on states of charge of the respective energy storage elements, and controls the plurality of energy storage elements based on the individual storage power set points for dispatching storage power to perform automatic generation control.

16 Claims, 9 Drawing Sheets

(52) U.S. Cl.
CPC .............................. *F05B 2270/404* (2013.01); *G05B 2219/2619* (2013.01); *Y02E 10/723* (2013.01)

(56) References Cited

U.S. PATENT DOCUMENTS

| | | | |
|---|---|---|---|
| 7,941,246 B2 | 5/2011 | Miller et al. | |
| 8,008,804 B2 | 8/2011 | Capp et al. | |
| 8,301,311 B2 | 10/2012 | Nelson | |
| 2005/0077881 A1* | 4/2005 | Capp | H02J 3/30 322/29 |
| 2008/0028237 A1* | 1/2008 | Knight | H04L 12/66 713/300 |
| 2008/0195255 A1 | 8/2008 | Lutze et al. | |
| 2008/0224541 A1 | 9/2008 | Fukuhara | |
| 2008/0281663 A1* | 11/2008 | Hakim | B60L 11/1824 705/7.25 |
| 2011/0175565 A1 | 7/2011 | Lee | |
| 2012/0271475 A1 | 10/2012 | Wang et al. | |
| 2013/0030784 A1* | 1/2013 | Viassolo | G06Q 10/00 703/18 |
| 2013/0184884 A1 | 7/2013 | More et al. | |
| 2014/0042973 A1* | 2/2014 | Kawahara | H01M 10/441 320/118 |

OTHER PUBLICATIONS

F. Blaabjerg and K. Ma, "Future on Power Electronics for Wind Turbine Systems," in IEEE Journal of Emerging and Selected Topics in Power Electronics, vol. 1, No. 3, pp. 139-152, Sep. 2013. doi: 10.1109/JESTPE.2013.2275978.*

European Search Report and Written Opinion issued in connection with corresponding EP Application No. 15156121.4-1904 dated Aug. 21, 2015.

Spahic et al., "The Impact of the "Wind Farm-Battery" Unit on the Power System Stability and Control", Power Tech, 2007 IEEE Lausanne, pp. 485-490, Jul. 2007.

Jalali, "DFIG Based Wind Turbine Contribution to System Frequency Control", Thesis presented to the University of Waterloo in fulfillment of the thesis requirement for the degree of Master of Applied Science in Electrical and Computer Engineering, pp. 1-92, 2011.

Antonishen et al., "A methodology to enable wind farm participation in automatic generation control using energy storage devices", Power and Energy Society General Meeting, 2012 IEEE, pp. 1-7, Jul. 2012.

Aho et al., "A Novel Active Power Control System for Wind Turbines Capable of AGC and Primary Response", American Institute of Aeronautics and Astronautics, pp. 1-10, 2013.

* cited by examiner

SYSTEM AND METHOD FOR AUTOMATIC GENERATION CONTROL IN WIND FARMS

BACKGROUND

Embodiments of the present invention generally relate to wind farms and more particularly relate to a system and method for automatic generation control in wind farms.

Wind turbines are used to generate electrical power from wind energy. Multiple wind turbines may be coupled together to form a wind farm, and multiple wind farms may be coupled to a power grid. The wind farms are required to provide a committed output power to the power grid for scheduling generation and maintaining load-generation balance. However, due to constant fluctuations in wind speed and in load coupled to the power grid, a difference may occur between a power injected into the power grid and the committed output power. The difference leads to variations in a system frequency, which necessitates a use of reserve resources to overcome such variations. In order to overcome the variation, the wind farms provide additional power control capability to the power grid to maintain the frequency.

In one type of control methodology, the power grid is managed by an independent system operator which directs owners of the wind farms coupled to the power grid to provide the additional power control capability and maintain the frequency in the power grid. The wind farm owners maintain the frequency by employing a primary frequency response, also referred to as frequency droop, and a secondary frequency response. The wind farm owners receive additional payments from the independent system operator for the secondary frequency response based on a control band and accuracy in providing a committed power for the second frequency response.

One type of secondary frequency response technique includes automatic generation control. The automatic generation control (AGC) is a system for adjusting power output of multiple generators located at various locations in the system, in response to changes in the system frequency and multiple tie-line powers of the interconnected power system. The automatic generation control employs various approaches to provide additional power for adjusting the power output. One approach includes using a centralized wind farm battery for providing the additional power to the power grid. However, such an approach leads to additional costs and associated risks such as a single point of failure in providing additional power.

In another approach, a distributed storage wind farm may be deployed to automatically provide additional power control. In such approaches, some of the wind turbines in the wind farm include an integrated energy storage element that may be used to supplement wind generated power and provide the additional power. In the described approach, wind turbine controllers of each of the wind turbine independently control the respective integrated energy storage elements.

It would be desirable for wind farms to have further options for addressing frequency variations and controlling integrated energy storage elements.

BRIEF DESCRIPTION

In one embodiment, a method for automatic generation control in a wind farm is provided. The method includes receiving an automatic generation control set point from an independent system operator, generating a farm-level storage power set point for the wind farm based on the automatic generation control set point using a wind farm controller, generating individual storage power set points for a plurality of energy storage elements coupled to a plurality of wind turbines using the wind farm controller, wherein the individual storage power set points are generated based on a states of charge of the respective energy storage elements, and controlling the plurality of energy storage elements based on the individual storage power set points for dispatching storage power to perform, automatic generation control.

In another embodiment, a system for automatic generation control in a wind farm is provided. The system includes a plurality of wind turbines, a plurality of energy storage elements integrated within or coupled to respective ones of the plurality wind turbines and a wind farm controller for controlling the plurality of energy storage elements. The wind farm controller is configured to execute the steps of receiving an automatic generation control set point from an independent system operator, generating a farm-level storage power set point for the wind farm based on the automatic generation control set point, generating individual storage power set points for a plurality of energy storage elements coupled to a plurality of wind turbines, wherein the individual storage power set points are generated based on a states of charge of the respective energy storage elements, and controlling the plurality of energy storage elements based on the individual storage power set points for dispatching storage power to perform automatic generation control.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean one, some, or all of the listed items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. Furthermore, the terms "circuit," "circuitry," "controller," and "processor" may include either a single component or a plurality of components, which are either active and/or passive and are connected or otherwise coupled together to provide the described function.

Embodiments of the present invention include a system and method for automatic generation control in a wind farm. The system includes a plurality of wind turbines, a plurality of energy storage elements, and a wind farm controller for centrally controlling the plurality of energy storage elements. In one specific embodiment, the wind farm controller receives an automatic generation control set point from an independent system operator, generates a farm-level storage power set point for the wind farm based on the automatic generation control set point, and generates individual storage power set points for the plurality of energy storage elements based on states of charge of the respective energy storage elements. The wind farm controller then controls the plurality of energy storage elements based on the individual storage power set points and thus to perform automatic generation control.

Figure 1:
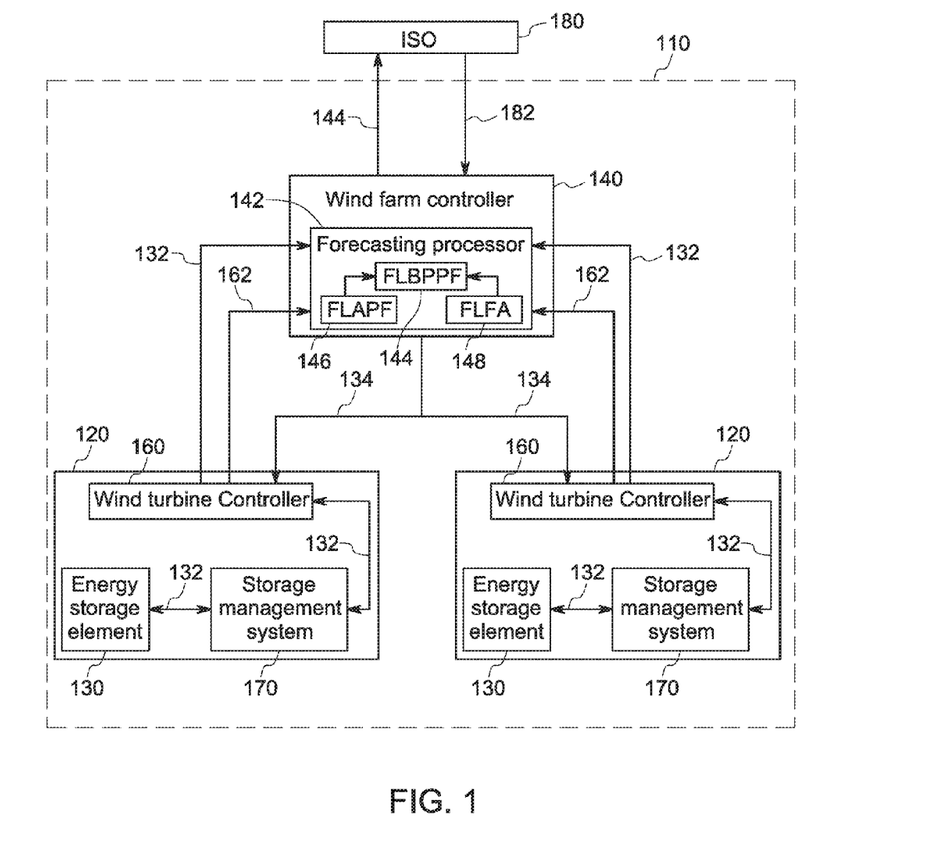
FIG. 1 is a block diagram representation of a wind farm including a system for controlling the wind farm in accordance with an embodiment of the invention.

FIG. 1 is a block diagram representation of a wind farm 100 including a system 110 for automatic generation control in the wind farm 100 in accordance with an embodiment of the invention. The wind farm 100 includes a plurality of wind turbines 120 for generating power in the wind farm 100. The wind farm 100 also includes a plurality of energy storage elements 130 integrated within or coupled to the plurality of wind turbines 120. In one embodiment, the wind farm 100 comprises a distributed storage type wind farm, and at least some of the wind turbines 120 each include an integrated energy storage element 130 coupled thereto. The wind farm 100 includes a wind farm controller 140 that controls a power generation of the wind farm 100. The wind farm controller 140 includes a forecasting processor 142 that generates a farm-level base point power forecast 144 (FLBPPF) for the wind farm 100. In one embodiment, the farm-level base point power forecast 144 includes a farm-level aero power forecast 146 (FLAPF) and a farm-level forecast adjustment 148 (FLFA). In a specific embodiment, the wind farm 100 includes wind turbine controllers 160 for generating a plurality of turbine-level aero power forecasts 162 for the plurality of wind turbines 120. The turbine-level aero power forecast 162 for a wind turbine 120 includes a forecast of wind power that may be generated by the wind turbine 120 using wind power. In a specific embodiment, the turbine-level aero power forecast 162 is based on historical aero power data. In a more specific embodiment, the wind turbine controller 160 generates the turbine-level aero power forecast 162 using a persistence method. The forecasting processor 142 may receive the plurality of turbine-level aero power forecasts 162 from the wind turbine controllers 160 and generate the farm-level aero power forecast 146 by adding the turbine-level aero power forecasts 162.

The wind farm controller 140 also generates the farm-level forecast adjustment 148 for the wind farm 100. The wind farm controller 140 receives states of charge 132 of the plurality of energy storage elements 130 from the wind turbine controllers 160 which in turn receive the states of charge 132 from a plurality of storage management systems 170 communicatively coupled to the wind turbine controllers 160. The plurality of storage management systems 170 may track the states of charge 132 of the plurality of energy storage elements. The wind farm controller 140 receives the states of charge of the plurality of energy storage elements 130 from the storage management systems 170 and computes an average state of charge of the plurality of energy storage elements 130 represented on a farm-level droop characteristic curve of the plurality of energy storage elements 130. In one embodiment, the droop characteristic curves of the energy storage elements 130 may be determined based on a type of the energy storage element 130, a size of the wind farm 100, a rating of the energy storage element 130, a variability of the wind, or combinations thereof. The wind farm controller 140 further generates the farm-level forecast adjustment 148 based on the average state of charge of the plurality of energy storage elements 130 in such a manner as to bring the states of charge of the plurality of the storage elements 130 within a dead band limit of a desired state of charge.

In another embodiment, the wind turbine controllers 160 may generate turbine-level base point power forecasts (not shown) of the respective wind turbines 120. The turbine-level base point power forecasts may be transmitted to the forecasting processor 142 for generating the farm-level base point power forecast 144. The forecasting processor 142 adds the turbine-level base point power forecasts received from the plurality of wind turbines 120 to generate the farm-level base point power forecast 144. Each of the turbine-level base point power forecasts may include the turbine-level aero power forecast 162 of the respective wind turbines 120 and a turbine-level forecast adjustment (not shown) computed by the wind turbine controller 160. The wind turbine controller 160 may compute the turbine-level forecast adjustment based on a turbine-level droop characteristics curve and adjusts the turbine-level aero power forecast 162 using the turbine-level forecast adjustment to generate the turbine-level base point power forecast. The turbine-level base point power forecasts are transmitted from each of the wind turbines 120 to the forecasting processor 142 where the forecasting processor 142 adds the turbine-level base point power forecasts to generate the farm-level base point power forecast 144.

Figure 2:
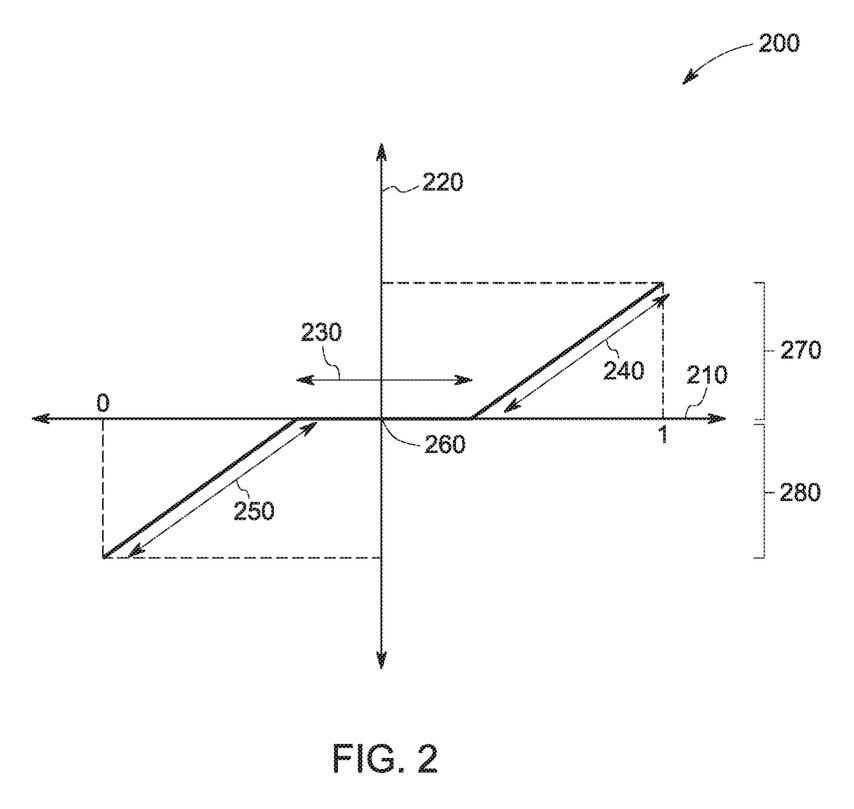
FIG. 2 is a graphical representation of a droop characteristic curve of a state of charge of an energy storage element in accordance with an embodiment of the invention.

Referring to FIG. 2, an exemplary graphical representation of an example droop characteristic curve 200 representing the average state of charge of the energy storage elements 130 in the wind farm (FIG. 1) is shown in accordance with an embodiment of the invention. X-axis 210 represents the average state of charge of the plurality of energy storage elements. Y-axis 220 represents a farm-level storage power of the plurality of energy storage elements. Curve 230 represents a dead band limit of the average state of charge. The dead band limit may be defined a threshold range of the average state of charge of the plurality of energy storage elements. Slope 240 represents a positive power slope, and slope 250 represents a negative power slope. The positive power slope represents a condition where the farm-level base point power forecast is adjusted such that the plurality of energy storage elements may be discharged to provide farm-level storage power to a power grid (not shown). In contrast, the negative power slope represents a condition where the farm-level base point power forecast is adjusted such that the plurality of energy storage elements is capable of being charged by receiving the farm-level power from the power grid or the wind turbine (FIG. 1). The plurality of energy storage elements may be charged or discharged to reach a target state of charge represented by arrow 260. The target state of charge may be defined as a predefined position in the dead band limit at which the average state of charge of the plurality of energy storage elements is desired to be maintained. In one embodiment, the target state of charge may be predetermined by a wind farm operator, and the plurality of energy storage elements may be configured accordingly to operate based on the target state of charge. The average state of charge may represent a positive farm-level storage power 270 or a negative farm-level storage power 280 based on the position of the average state of charge in the positive farm-level power slope or the negative farm-level power slope respectively. The wind farm controller receives the states of charge of the plurality of energy storage elements and generates the farm-level forecast adjustment. The farm-level forecast adjustment is added to the farm-level aero power forecast to generate the farm-level base point power forecast. The farm-level base point power forecast may either increase or decrease based on the positive power forecast or the negative power forecast respectively.

Figure 3:
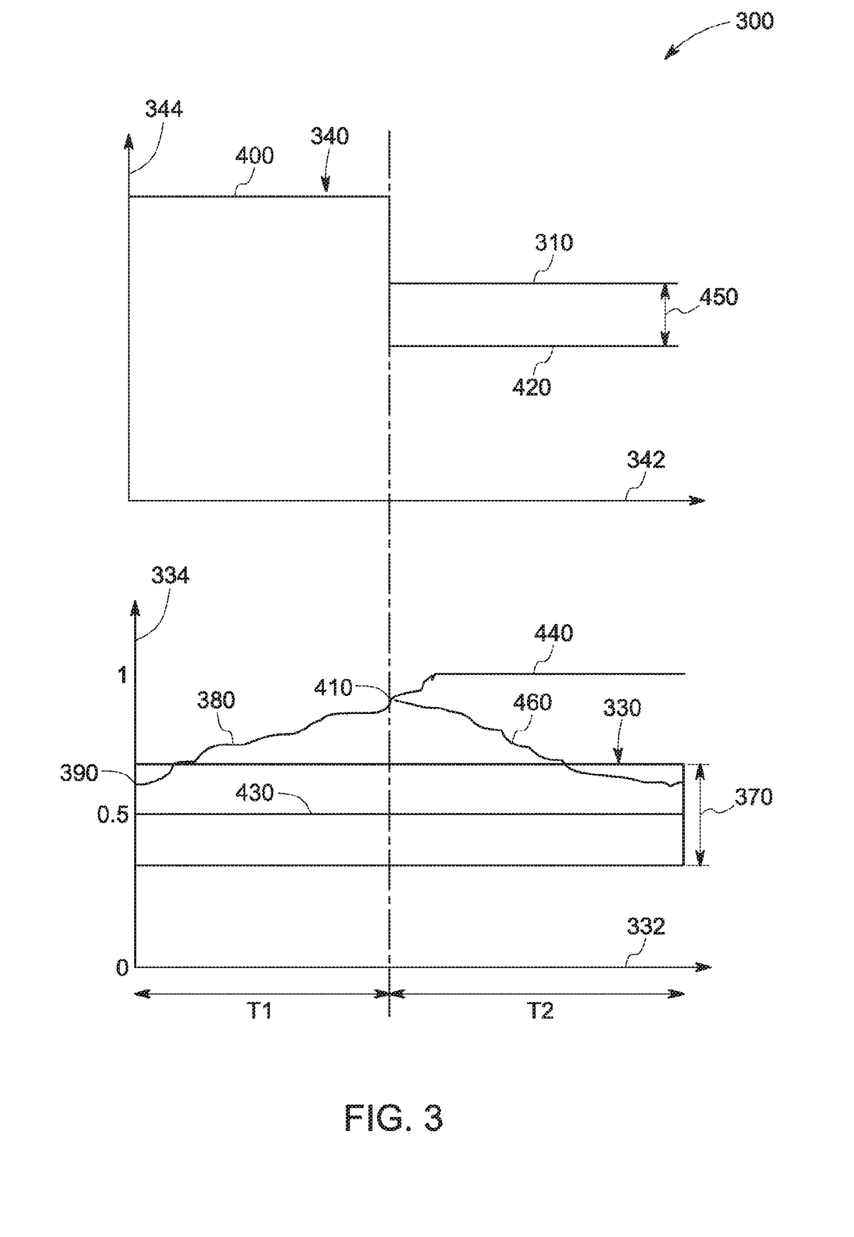
FIG. 3 is an exemplary graphical representation of the farm-level base point power forecast based on the position of the state of charge in the positive power slope (FIG. 2) during time intervals T1 and T2 in accordance with an embodiment of the invention.

For example, FIG. 3 illustrates an exemplary graphical representation 300 of the farm-level base point power forecast based on the position of the average state of charge in the positive farm-level power slope (FIG. 2) during time intervals T1 and T2. For the purposes of this example, the wind farm may include one wind turbine and one energy storage element for generating the farm-level base point power forecast. The graphical representation 300 includes a graph 330 representing the average state of charge of the plurality of energy storage elements (FIG. 1) during time interval T1 and T2. The graphical representation 300 also includes a graph 340 corresponding to the graph 330 representing the farm-level base point power forecast (FIG. 1) during time intervals T1 and T2. The graphs 330, 340 include an X-axis 332, 342 representing time. Y-axis 334 in the graph 330 represents the average state of charge, and Y axis 344 in the graph 340 represents the farm-level base point power forecast respectively. Section 370 represents the dead band limit of the average state of charge. Curve 380 represents the average state of charge relative to the time.

The wind farm controller 140 (FIG. 1) determines a first value 390 representative of about zero point five (0.5) as the average state of charge of the plurality of energy storage elements at a beginning of the time interval T1. During the time interval T1, if a measured farm aero power of the wind farm (FIG. 1) is more than a first forecasted farm-level base point power 400, the wind farm controller (FIG. 1) computes a difference between the measured farm aero power and the first forecasted farm-level base point power 400. The first forecasted farm-level base point power 400 may be defined as a forecasted farm-level base point power for the time interval T1. The wind farm controller controls the plurality of energy storage elements (FIG.1) to receive a differential power between the measured farm aero power and the first forecasted farm-level base point power 400. The plurality of energy storage elements absorbs the differential power due to which the average state of charge of the plurality of energy storage elements increases from about zero point five (0.5) to a second value of about one (1) represented by reference numeral 410 at the end of time interval T1.

Simultaneously, the wind farm controller generates an aero power forecast represented by reference numeral 420 for the time interval T2 in the corresponding graph 340. The wind farm controller also obtains the states of charge of the plurality of energy storage elements at the end of time interval T1 and determines the average state of charge at the end of time interval T1. Since the value 410 representing the average state of charge is about one (1), the wind farm controller identifies that the position of the average state of charge is in the positive farm-level power slope, and the plurality of energy storage elements may discharge to provide farm-level storage power. Hereinafter, the terms "value representing the average state of charge" and "the position of the average state of charge" are used interchangeably as the position of the average state of charge is represented by the value representing the average state of charge. The amount of farm-level storage power that may be provided by the plurality of energy storage elements is computed based on a difference between a target state of charge 430 and a current average state of charge represented by the position of the average state of charge. Additionally, as the average state of charge of the plurality of energy storage elements is one (1), the plurality of energy storage elements have reached a saturation condition represented by curve 440. The saturation condition may be defined as a condition in which, the plurality of energy storage elements in the wind farm have reached a storage power saturation limit and will be unable to further store the differential power that may be received by the plurality of energy storage elements during the time interval T2. Therefore, the wind farm controller (FIG. 1) generates a farm-level forecast adjustment 450 for time interval T2 that represents a condition to provide farm-level storage power to the power grid.

The wind farm controller adds the farm-level aero power forecast 420 and the farm-level forecast adjustment 450 to generate the farm-level base point power forecast for the time interval T2 represented by 460 in the corresponding graph 340. The plurality of energy storage elements provide the farm-level storage power by discharging the plurality of energy storage elements and reduce the average state of charge from the value 410 towards the section 370 of dead band limit represented by the curve 470. The aforementioned process may be repeated continuously to maintain the state of charge within the dead band limit and more particularly, at the target state of charge.

With continued reference to FIG. 1, the wind farm controller 140 further transmits the farm-level base point power forecast 144 to an independent system operator 180 (ISO) The independent system operator (ISO) may be defined as a neutral party responsible for management and control of an electric transmission grid in a state or region. The independent system operator operates an electrical transmission system that it does not own and ensures safety and reliability of the electrical transmission system for the purpose of providing open access to retail and wholesale markets for supply of power. The wind farm controller 140 measures a farm-level base point power at a point of interconnection to a power grid (not shown) and computes a wind farm error by determining a difference between the farm-level base point power forecast 144 and the measured base point power.

During normal operation of the wind farm 100, the wind farm controller 140 may determine an additional power that may be provided by the wind farm 100 to the power grid. The additional power may be used to regulate a frequency on the power grid. The wind farm owner may submit a bid to the independent system operator 180 specifying an amount of additional power that the wind farm may provide for regulating the frequency of the power grid. The independent system operator 180 may generate the automatic generation control set point 182 for the wind farm 100 based on the bid and transmits the automatic generation control set point 182 to the wind farm 100 upon variations in the frequency. In one embodiment, the automatic generation control set point 182 may be generated based on a grid frequency control set point and a tie-switch power set point. In a more specific embodiment, the grid frequency control set point may include a set point for providing the storage power for a grid-level frequency error that may be generated due to other generators, including wind farms that are being managed by the independent system operator 180.

Also, the automatic generation control set point 182 is based on the tie line power set point. In situations, where a power grid is coupled to adjacent power control areas, the power grid is required to perform power exchange with the other control areas at prescheduled time intervals for a specific power export/import scheduled amount. The independent system operator 180 may generate the automatic generation control set point 182 based on the grid-level frequency error and a tie-line power error. The independent system operator 180 transmits the automatic generation control set point 182 to the wind farm controller 140, and the wind farm controller 140 controls the plurality of energy storage elements 130 to provide the storage power based on the automatic generation control set point.

In some embodiments, the plurality of energy storage elements may be used to provide storage power for exclusively meeting the automatic generation control set point 182 without participating in forecast adjustment 148 for generating the farm-level base point power forecast 144. In such an embodiment, the wind farm controller 140 communicates the automatic generation control set point 182 to the plurality of energy storage elements 130 for meeting the automatic generation control set point 182.

The wind farm controller 140 receives the automatic generation control set point 182 and generates a farm-level storage power set point for the plurality of energy storage elements 130. The automatic generation control set point 182 includes a value of a power demanded from the wind farm 100. The wind farm controller 140 obtains the value of the demanded power and generates the farm-level storage power set point based on the value of the demanded power. The wind farm controller 140 further generates individual storage power set points 134 for each of the energy storage elements 130 based on the states of charge of the plurality of energy storage elements 130 and transmits the individual storage power set points 134 to the wind turbine controllers 160. The storage power set points 134 may be generated to balance the states of charge of the energy storage elements 130. In one embodiment, balancing the states of charge may include equalizing the states of charge of the energy storage elements 130.

Figure 4:
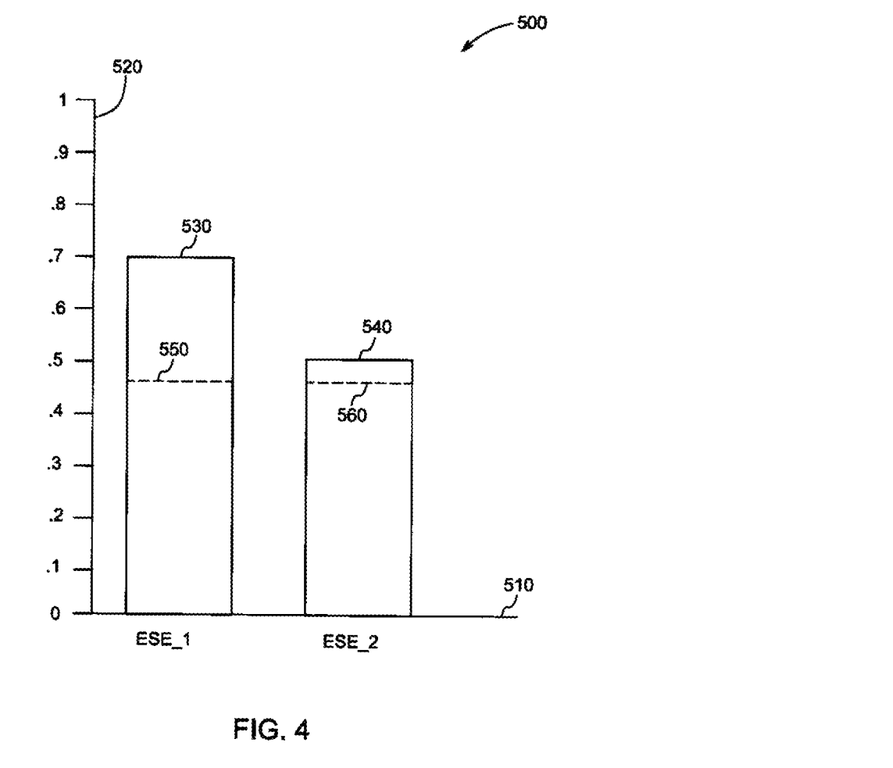
FIG. 4 is an exemplary graphical representation of an example of states of charge of two energy storage elements in a wind farm depicting discharge of power from a plurality of energy storage elements in accordance with one embodiment of the invention.

FIG. 4 is an exemplary graphical representation 500 of an example of states of charge of two energy storage elements in the wind farm 100 depicting discharge of power from the energy storage elements in accordance with one embodiment of the invention. X-axis 510 represents the energy storage elements. Y-axis 520 represents states of charge of a first energy storage element (ESE_1) and a second energy storage element (ESE_2). In this example, the first energy storage element and the second energy storage element have a rated energy of hundred kilowatt-hours each. Assume that a first state of charge 530 of the first energy storage element is zero point seven (0.7) and a first state of charge 540 of the second energy storage element is zero point five (0.5). Therefore, the storage energy available in the first energy storage element and the second energy storage element may include seventy kilowatt-hours and fifty kilowatt-hours respectively. A wind farm controller receives an automatic generation control set point including a farm-level storage power of thirty kilo-watts. The wind farm controller may generate a first individual storage power set point for the first energy storage element to provide twenty five (25) kilo-watts of power and a second individual storage power set point for the second energy storage element to provide five (5) kilo-watts of storage power. Therefore, the first and the second energy storage elements may collectively provide thirty kilo-watts of storage power to meet the automatic generation control set point. Based on the individual storage power set points, a second state of charge 550 of the first energy storage element and the second state of charge 560 of the second energy storage element may reach an equal state of charge representing zero point four five (0.45). Similarly, the wind farm controller may generate the individual storage power set points for 'n' number of energy storage elements in the wind farm based on the states of charge ratios of the energy storage elements.

Various methods may be applied by the wind farm controller 140 to generate the individual storage power set points 134. Such methods may depend on different control mechanisms that may be used to control the plurality of energy storage elements for dispatching the storage power to meet the demanded power. In one embodiment, for example, the wind farm controller 140 may employ an aggressive optimal dispatch method for determining the individual storage power set points 134.

The aggressive optimal dispatch method includes a quadratic program which is used to dispatch storage power to meet a farm-level power demand identified based on the automatic generation control set points 182. The aggressive optimal dispatch method also equalizes the states of charge of the plurality of energy storage elements 130. An objection function of the quadratic program may be stated as:

$$K_1 \left[ PD\_MW(t) - \sum_{i=1}^{N} ESE\_P_i(t) \right]^2 -$$

$$K_2 \left[ -\sum_{i=1}^{N} \alpha_i ESE\_P_i(t) + \sum_{i=1}^{N} \beta_i ESE\_P_i(t) \right]$$

where PD_MW(t) is the farm-level power demand, ESE_$P_i$(t) is a storage power response for an energy storage element 'i' at time 't', $K_1$, $K_2$ are weighing factors for individual objective costs, N is a number of energy storage elements in the wind farm and $\alpha_i$, $\beta_i$ are weighing factors for charge and discharge of the energy storage elements 'i' respectively. In one embodiment, the objective functions for $K_1$, $K_2$ may include farm-level power demand set point and equalization of states of charge respectively. An optimal dispatch solution for the dispatch methods may be obtained by minimizing the objective functions. Also, the weighing factor K1 may be assigned a higher value with respect to K2 to ensure that the farm-level power demand set point is given priority over the equalization of states of charge. Additionally, a negative sign may represent a charge power and positive sign may represent a discharge power in the quadratic program. Moreover, the weighing factor $\alpha_i$ represents a charge coefficient, and the weighing factor $\beta_i$ represents a discharge coefficient, where $\alpha_i$, $\beta_i$ may be represented as:

$$\alpha_i = \frac{1 - SOC_i(t-1)}{\sum_{i=1}^{N} 1 - SOC_i(t-1)}$$

$$\beta_i = \frac{SOC_i(t-1)}{\sum_{i=1}^{N} SOC_i(t-1)}$$

where $SOC_i$ represents a state of charge of the energy storage element 'i' and (t−1) represents a previous time interval with respect to time interval "t".

The wind farm controller 140 may also use one or more constraints in addition to the various dispatch calculation methods. In one embodiment, the plurality of constraints may include power limits of the energy storage element, state of charge limits of the energy storage element, wind turbine constraints, a state of charge link constraint, or combinations thereof. In addition, the wind farm controller 140 may also choose to operate all energy storage elements in a particular duty state. For example, if power is required from the plurality of energy storage elements, the wind farm controller 140 can ensure only discharge operation from all the energy storage elements by setting the charge coefficients $\alpha_i$ for all the energy storage elements to 0.

The power limits of the energy storage element may be represented as $$ESE\_P_{chrg} \leq ESE\_P_i(t) \leq ESE\_P_{dischrg}.$$

The power limits constraint represents that a dispatchable storage power in any energy storage element at any time interval ($ESE\_P_i(t)$) may be greater or equal to a power available for charging the energy storage element ($ESE\_P_{chrg}$) and may be lesser or equal to a power available for discharge in the energy storage element ($ESE\_P_{dischrg}$).

The state of charge constraint may be represented as:

$$SOC_{low} \leq SOC_i(t) \leq SOC_{high}$$

where $SOC_i$ (t) represents a state of charge of the energy storage element 'i' at time interval 't', $SOC_{low}$ represents a predefined lowest state of charge of the energy storage element, $SOC_{high}$ represents a predefined highest state of charge of the energy storage element. The state of charge of the energy storage element 'i' at time 't' will always be greater or equal to a predefined lowest state of charge of the energy storage element and will be lesser or equal to a predefined highest state of charge of the energy storage element.

In one embodiment, the wind turbine constraints may include a constraint related to a rated power of a wind turbine. A line side converter of the wind turbine is rated for a particular power and a total power that may be generated by the wind turbine in a time interval may not be more than the a power rating of the line side converter and in turn the rated power of the wind turbine. The wind turbine constraints may be represented as:

$$PTurb_i(t-1) + ESE\_P_i(t) \leq PTurbRating_i$$

where $PTurb_i(t-1)$ represents a aero power generated by the wind turbine, $ESE\_P_i(t)$ represents a storage power of the energy storage element in the wind turbine, and $PTurbRating_i$ is the power rating of the wind turbine.

The state of charge link constraint represents a storage power variation between two time intervals including two different states of charge. The state of charge link constraint may be represented as:

$$ESE\_P_i(t) = [SOC_i(t-1) - SOC_i(t)] \frac{ESE\_ERating * 3600}{\Delta t}$$

where $ESE\_P_i(t)$ represents a storage power of the energy storage element 'i', $SOC_i$ (t) represents a state of charge in time interval 't', $SOC_i$ (t−1) represents a state of charge in a previous time interval, $ESE\_ERating_i$ represents a rating of the energy storage element, and $\Delta t$ is a difference in time between the time interval (t) and the previous time interval (t−1).

The aggressive optimal dispatch method ensures that the energy storage elements with highest charging or discharging coefficients are charged or discharged respectively prior to controlling an energy storage element with lesser charging or discharging coefficients. Such a method equalizes the states of charge at a fastest possible rate and leads to early equalization of states of charge of the energy storage element.

Figure 5:
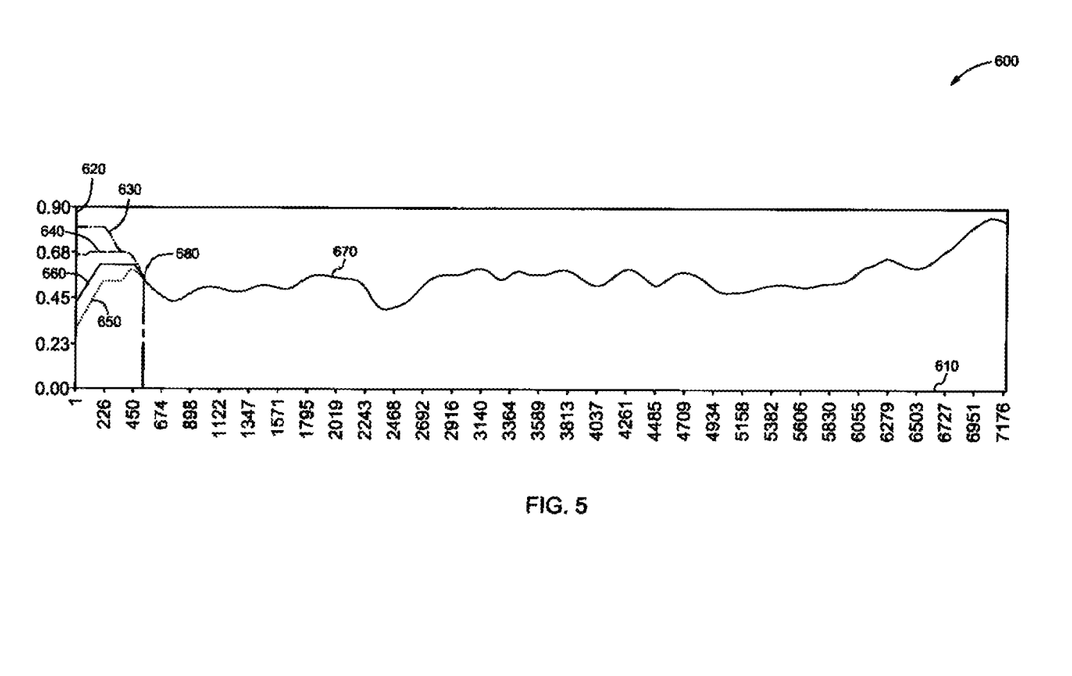
FIG. 5 is an exemplary graphical representation of states of charge of a plurality of energy storage elements over a period of time while employing an aggressive optimal dispatch method in accordance with an embodiment of the invention.

FIG. 5 is an exemplary simulated graphical representation 600 of states of charge of the plurality of energy storage elements over a period of time by employing the aggressive optimal dispatch method in accordance with an embodiment of the invention. X-axis 610 represents a time in seconds. Y-axis 620 represents a state of charge. Curve 630 represents a state of charge of first energy storage element. Curve 640 represents a state of charge of a second energy storage element. Curve 650 represents a state of charge of a third energy storage element. Curve 660 represents a state of charge of a fourth energy storage element. Curve 670 represents an equalized state of charge of the four energy storage elements. The states of charge of the four energy storage elements equalize at point 680 representing an equalization time of around five hundred and sixty two seconds and remain equalized for the remainder of the time period.

In another embodiment, the wind farm controller 140 controls the dispatch of storage power from the plurality of energy storage elements 130 by generating the individual storage power set points based on a non-aggressive optimal dispatch method. In this embodiment, the state of charge of the energy storage elements 130 equalize gradually over a period of time when compared to the aggressive optimal dispatch method. In this embodiment, the farm-level power demand is obtained proportionately from each of the plurality of energy storage elements 130 based on the states of charge of the plurality of energy storage elements 130. Such an embodiment provides an improved life time for the plurality of energy storage elements 130 with respect to the aggressive optimal dispatch method. The non-aggressive optimal dispatch method also includes a quadratic program and may be represented as:

$$K_1\left[PD\_MW(t) - \sum_{i=1}^{N} ESE\_P_i(t)\right]^2 -$$
$$K_2[Slack1_{pos(t)} + Slack1_{neg(t)} + Slack2_{pos(t)} + Slack2_{neg(t)}]$$

where PD_MW(t) is the farm-level power demand, $ESE\_P_i(t)$ is a storage power response for an energy storage element 'i' at time 't', $K_1$, $K_2$ are weighing factors for individual objective costs, N is a number of energy storage elements in the wind farm. The variables $Slack1_{pos(t)}$ and $Slack1_{neg(t)}$ represent a positive slack variable and a negative slack variable respectively for charging the plurality of energy storage elements 130 based on the states of charge. Also, the variables $Slack2_{pos(t)}$ and $Slack2_{neg}$ (t) represent the sum of positive slack variable and a negative slack variable respectively for discharging the plurality of energy storage elements 130 based on the states of charge of the plurality of energy storage elements 130. In one embodiment, a slack variable may be defined as a variable that is added to an inequality constraint to transform it to equality. The slack variable is introduced to replace an inequality constraint with an equality constraint and a non-negativity constraint.

In one embodiment, the power limit constraints may be modified to include the slack variable for determining the storage power in the plurality of energy storage elements 130. The modified constraints ensure the proportionate assignment of the farm-level demand power for the plurality of energy storage elements 130. The storage power that may be provided by an energy storage element during a discharge may be determined by:

$$ESE\_P_i(t) = \beta_i * PD\_MW(t) + Slack2_i pos(t) - Slack2_i neg(t)$$

where $\beta_i$ is a discharge coefficient for the plurality of energy storage elements, PD_MW (t) is the farm-level power demand, $ESE\_P_i(t)$ is a storage power response for an energy storage element 'i' at time 't'. The variables $Slack2_i pos(t)$ and $Slack2_i neg(t)$ represent a positive slack variable and a negative slack variable respectively for discharging the storage element 'i' based on the states of charge of the plurality of energy storage elements.

The storage power that may be received by the energy storage element during charging may be determined by:

$$ESE_{P_i(t)} = \alpha_i * PD\_MW(t) + Slack1_i pos(t) - Slack1_i neg(t)$$

where $\alpha_i$ is a charge coefficient for the storage element 'i', PD_MW(t) is the farm-level power demand, $ESE\_P_i(t)$ is a storage power response for an energy storage element 'i' at time 't'. The variables $Slack1_i pos(t)$ and $Slack1_i neg(t)$ represent a positive slack variable and a negative slack variable respectively for charging the storage element 'i' based on the states of charge of the plurality of energy storage elements.

Figure 6:
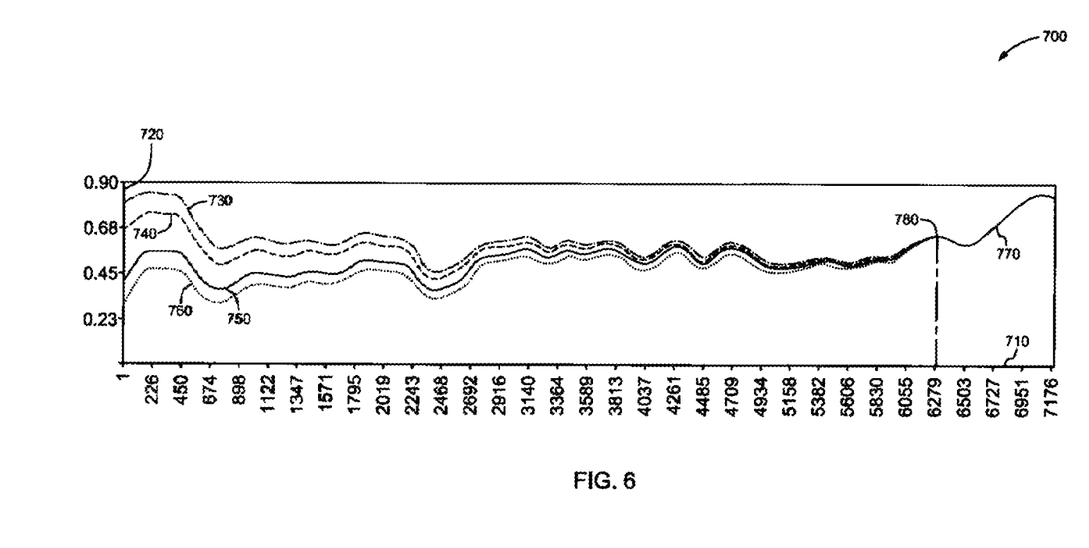
FIG. 6 is an exemplary graphical representation of states of charge of a plurality of energy storage elements over a period of time by employing a non-aggressive optimal dispatch method in accordance with an embodiment of the invention.

FIG. 6 is an exemplary simulated graphical representation 700 of states of charge of the plurality of energy storage elements over a period of time by employing the non-aggressive optimal dispatch method in accordance with an embodiment of the invention. X-axis 710 represents a time in seconds. Y-axis 720 represents a state of charge. Curve 730 represents a state of charge of first energy storage element. Curve 740 represents a state of charge of a second energy storage element. Curve 750 represents a state of charge of a third energy storage element. Curve 760 represents a state of charge of a fourth energy storage element. Curve 770 represents an equalized state of charge of the four energy storage elements. The states of charge of the four energy storage elements equalize at point 780 representing an equalization time around six thousand two hundred and seventy nine seconds and remain equalized for the remainder of the time period.

In another embodiment for obtaining individual storage power set points 134, the quadratic program may be simplified to a linear formulation. The simplification of the quadratic program to a linear program can be achieved by converting the demand requirement function into a constraint and defining non-negative slack variables as part of the constraint and in turn penalizing the objective function with the slack variables. For example, a linear formulation of the aggressive optimal dispatch method may be represented as:

$$K_1[PD\_slack1(t) + PD\_slack2(t)] - K_2\left[\sum_{i=1}^{N}\alpha_i ESE\_P_i(t) + \sum_{i=1}^{N}\beta_i ESE\_P_i(t)\right]$$

where PD_slack1(t) is a slack variable that models a positive error in the farm-level power demand, PD_slack2(t) is a slack variable that models a negative error in the farm-level power demand, $ESE\_P_i(t)$ is a storage power response for an energy storage element 'i' at time 't', $K_1$, $K_2$ are weighing factors for individual objective costs, N is a number of energy storage elements in the wind farm and $\alpha_i$, $\beta_i$ are weighing factors for charging and discharging of the energy storage elements respectively. In one embodiment, the objective functions for $K_1$, $K_2$ may include farm-level power demand set point and equalization of states of charge respectively. Also, the weighing factor K1 is assigned a higher value with respect to K2 to ensure that the farm-level power demand set point is given priority over the equalization of states of charge.

In still another embodiment for obtaining individual storage power set points, a linear formulation of the non-aggressive optimal dispatch method may be represented as:

$$K_1[PD\_slack1(t) + PD\_slack2(t)] - K_2[Slack1_{pos(t)} + Slack1_{neg(t)} + Slack2_{pos(t)} + Slack2_{neg(t)}]$$

where PD_slack1(t) is a slack variable that models a positive error in the farm-level power demand, PD_slack2(t) is a slack variable that models a negative error in the farm-level power demand, $K_1$, $K_2$ are weighing factors for individual objective costs, In one embodiment, the objective functions for $K_1$, $K_2$ may include farm-level power demand set point and equalization of states of charge respectively. Also, the weighing factor K1 is assigned a higher value with respect to K2 to ensure that the farm-level power demand set point is given priority over the equalization of states of charge. The variables $Slack1_{pos(t)}$ and $Slack1_{neg(t)}$ represent a positive slack variable and a negative slack variable respectively for charging the plurality of energy storage elements based on the states of charge. Also, the variables $Slack2_{pos(t)}$ and $Slack2_{neg}(t)$ represent a positive slack variable and a negative slack variable respectively for discharging the plurality of energy storage elements based on the states of charge of the plurality of energy storage elements.

The linear formulation may also employ additional constraints to dispatch the storage power. The additional constraints may include that the slack variable for the positive error in the farm-level power demand (PD_slack1(t)) and the slack variable for the negative error in the farm-level power demand (PD_slack2(t)) are greater than or equal to zero. The linear formulation also includes a constraint on the farm-level power demand that may be represented as:

$$PD\_MW(t) = \sum_{i=1}^{N} ESE\_P_i(t) + PD\_slack1(t) - PD\_slack2(t)$$

where PD_MW (t) represents a farm-level power demand at time 't', ESE_P$_i$(t) represents storage power of the energy storage element 'i', PD_slack1(t) represents the slack variable for the positive error in the farm-level power demand and PD_slack2(t) represents the slack variable for the negative error in the farm-level power demand.

Figure 7:
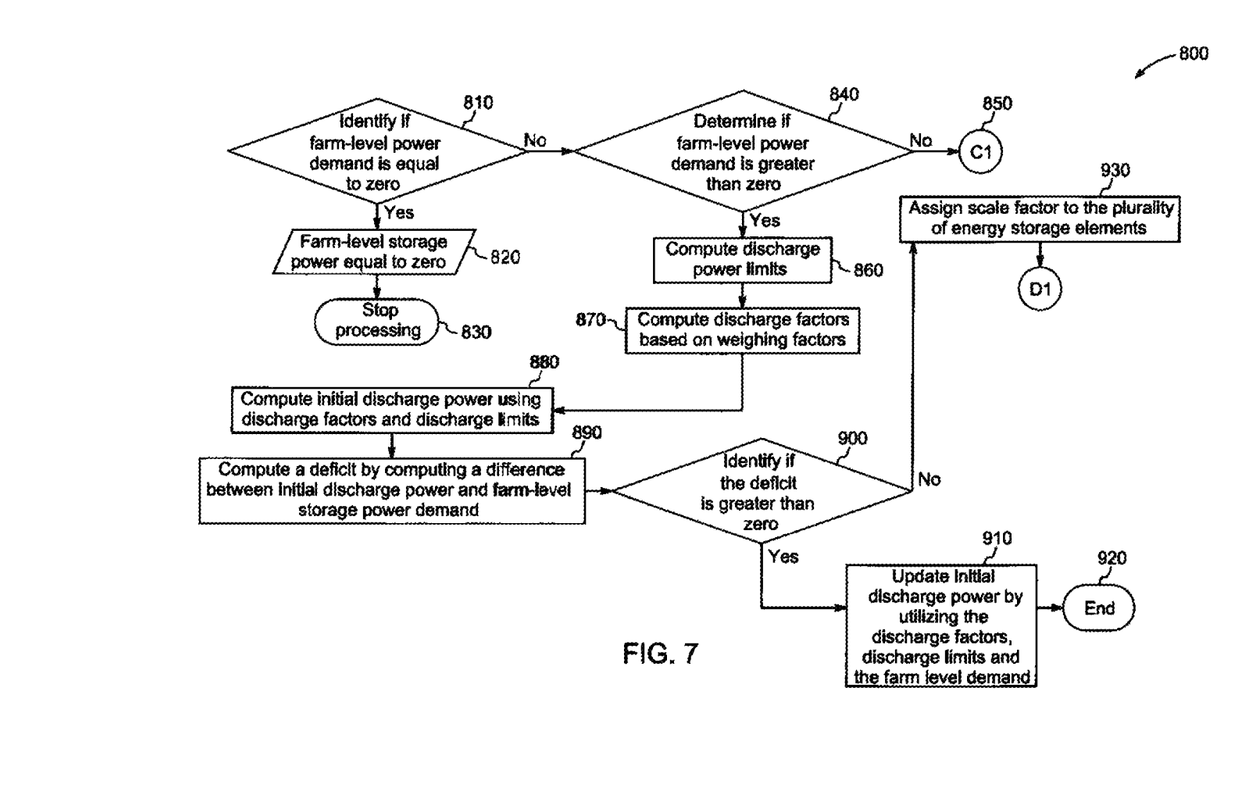
FIG. 7 is a flow chart representing steps performed by the wind farm controller for controlling the energy storage elements using an iterative dispatch method in accordance with an embodiment of the invention.

FIG. 7 is a flow chart representing steps performed for controlling the energy storage elements using an iterative dispatch method 800 in accordance with an embodiment of the invention. In step 810, it is determined whether a farm-level storage power demand is equal to zero. The farm-level storage power demand is zero if an error between a farm-level power demand and a measured base point power of the wind farm is zero. In case the farm-level storage power demand is zero, it is identified that the storage power required from the energy storage element is equal to zero in step 820 and processing is stopped in step 830.

If the farm-level storage power demand is not equal to zero, it is determined whether the farm-level storage power demand is greater than zero or less than zero in step 840. If the farm-level storage power demand is less than zero the method 800 moves to step 850 for charging the energy storage element, and, if the farm-level storage power demand is greater than zero, the method 800 moves to step 860 for discharging the energy storage element.

In the step 860, discharge power limits of the energy storage elements are computed. The discharge power limits are computed based on states of charge of the energy storage elements. In step 870, discharge factors for the energy storage elements are computed based on weighing factors. The weighing factors are computed using the states of charge of the energy storage elements. Further, in step 880, a first initial discharge power that may be provided by the energy storage elements is computed using the discharge factors and the discharge power limits. In one embodiment, the first initial discharge power may be generated by computing a product of the discharge factors and the discharge power limits for each of the energy storage elements. In the next step 890, a difference between the first initial discharge power and the farm-level storage power demand is computed to provide a deficit. It is determined whether the deficit is greater than zero in step 900. If the deficit is greater than zero, the wind farm controller updates the initial discharge powers by utilizing the discharge factors, the discharge limits and the farm-level power demand in step 910 and ends the process in step 920. However, if the deficit is less than zero, the method assigns a scale factor for the plurality of energy storage elements in step 930.

Figure 8:
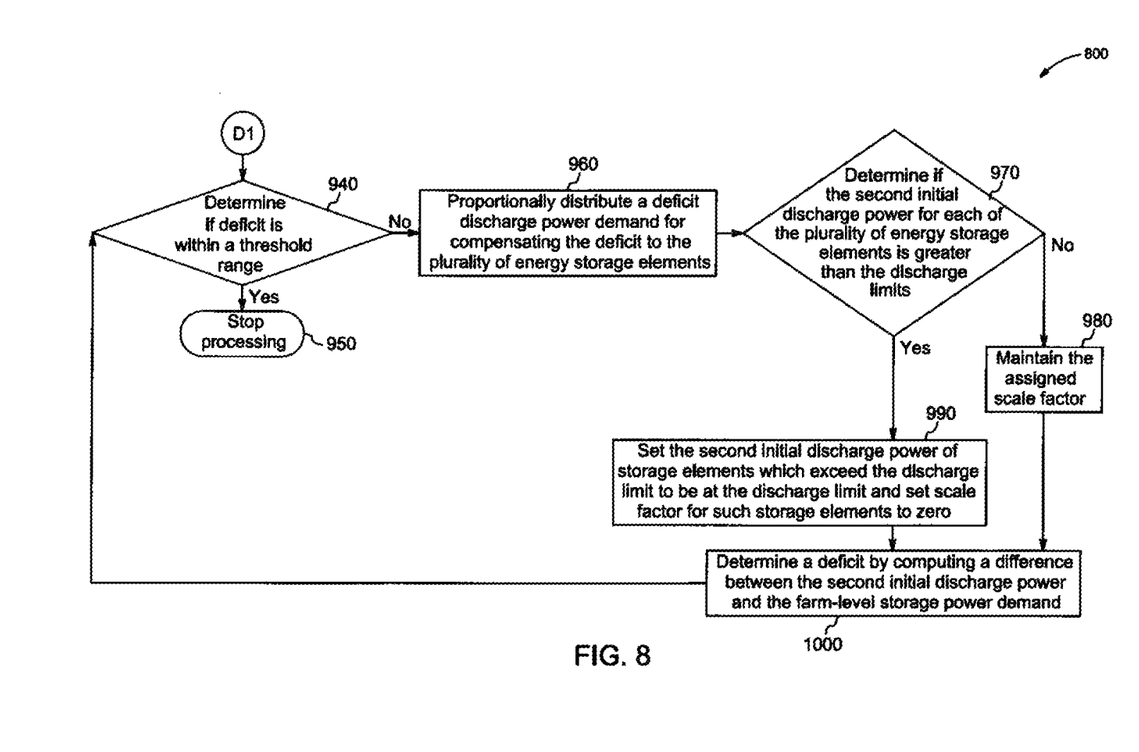
FIG. 8 is a continuation of the flow chart representing steps performed by the wind farm controller for controlling the energy storage elements using an iterative dispatch method in accordance with an embodiment of the invention.

FIG. 8 is a continuation of the flow chart of FIG. 7 representing steps performed by the wind farm controller for controlling the energy storage elements using an iterative dispatch method 800 in accordance with an embodiment of the invention. The method 800 further includes step 940 where it is determined whether the deficit is within a threshold range. If the deficit is within the threshold range, processing is stopped in step 950. In contrast, if the deficit is outside the threshold range, in step 960 a deficit discharge power demand is proportionally distributed to the plurality of energy storage elements for compensating the deficit. In one embodiment, a second initial discharge power is determined from a difference between the first initial discharge power of each of the plurality of wind turbines and the deficit discharge power demand from the energy storage elements. The second initial discharge power is compared against the discharge limits of the plurality of energy storage elements in step 970. If the second initial discharge power is less than the discharge limit of each of the plurality of energy storage elements, the wind farm controller maintains the assigned scale factor in step 980.

However, if the second initial discharge power is greater than the discharge limit, the wind farm controller sets the second initial discharge power equal to the discharge limit and sets the scale factor of the energy storage elements having reached their discharge limits to zero in step 990. In one embodiment, the discharging limit may control the energy storage elements to dispatch storage power equal to the dischargeable power. The method 800 further moves to a common step 1000 from steps 980 and 990 in which the wind farm controller determines a deficit by computing a difference between the second initial discharge power and the farm-level storage power demand. The method 800 further moves to step 940 for determining whether the deficit is within the threshold range. The method 800 further repeats the steps 950-1000 based on the deficit until the deficit is within the threshold range.

Similarly, if the farm-level storage power demand is less than zero in step 840, in step 850 steps 860-1000 may be applied for charging the plurality of energy storage elements. Steps 860 to 1000 are executed by replacing the discharge coefficients with charge coefficients in these steps.

Figure 9:
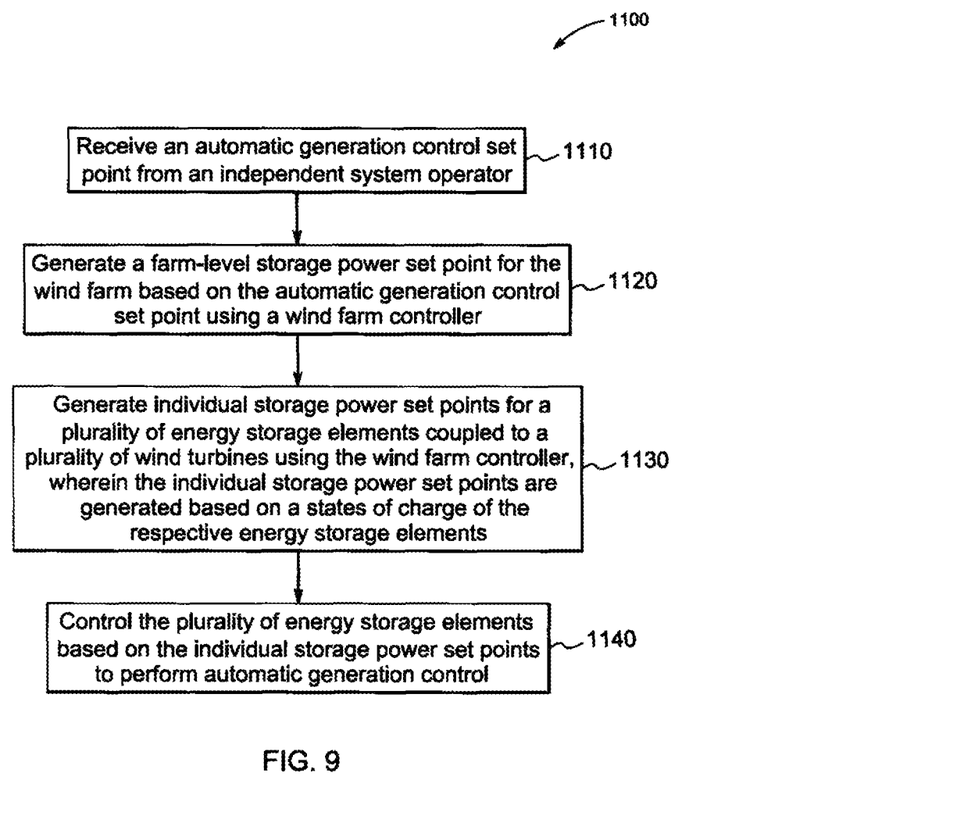
FIG. 9 is a flow chart representing steps involved in a method for controlling the plurality of energy storage elements in a wind farm in accordance with an embodiment of the invention.

FIG. 9 is a flow chart representing steps involved in a method 1100 for controlling the plurality of energy storage elements in a wind farm in accordance with an embodiment of the invention. The method 1100 includes receiving an automatic generation control set point from an independent system operator in step 1110. In one embodiment, a farm-level base point power forecast for the wind farm is generated prior to receiving the automatic generation control set point. In a specific embodiment, a farm-level aero power forecast and a farm-level forecast adjustment are generated for use in determining the farm-level base point power forecast. In a more specific embodiment, the farm-level aero power forecast is generated by adding a plurality of aero power forecasts received from a plurality of wind turbine controllers of the respective wind turbines. In another embodiment, an average state of charge of a plurality of energy storage elements is computed to generate the farm-level forecast adjustment. In a specific embodiment, the states of charge of the plurality of energy storage elements are obtained to compute the average state of charge of the plurality of energy storage elements. In another embodiment, the farm-level base point power forecast is generated by adding the turbine-level base point power forecasts. In a specific embodiment, the turbine-level base point power forecasts are generated based on the turbine-level aero power forecast and a turbine-level forecast adjustment generated by the wind turbine controller. In a more specific embodiment, the turbine-level aero power forecast is adjusted using the turbine-level forecast adjustment to generate the turbine-level base point power forecast. In one embodiment, the turbine level forecast adjustment is generated by the wind turbine controller based on the state of charge of the energy storage element of the respective wind turbine. The method 1100 also includes generating a farm-level storage power set point for the wind farm based on the automatic generation control set point in step 1120. In one embodiment, a wind farm error is computed based on a farm-level base point power forecast and a measured farm level aero power, prior to generating the farm-level storage power set point. The method 1100 further includes generating individual storage power set points for the plurality of energy storage elements based on states of charge of the respective energy storage elements in step 1130. In one embodiment, the individual storage power set points are generated based on the states of charge of the plurality of energy storage elements to balance the states of charge of the plurality of energy storage elements based on droop characteristic curves of the plurality of energy storage elements. In a specific embodiment, the states of charge of the plurality of energy storage elements are equalized to balance the states of charge of the plurality of energy storage elements. The method 1100 also includes controlling the plurality of energy storage elements based on the individual storage power set points to perform automatic generation control in step 1140.

It is to be understood that a skilled artisan will recognize the interchangeability of various features from different embodiments and that the various features described, as well as other known equivalents for each feature, may be mixed and matched by one of ordinary skill in this art to construct additional systems and techniques in accordance with principles of this disclosure. It is, therefore, to be understood that the appended claims are intended to cover all such modifications and changes as fall within the true spirit of the invention.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A method for automatic generation control in a wind farm comprising:
   receiving an automatic generation control set point from an independent system operator;
   generating a farm-level storage power set point for the wind farm based on the automatic generation control set point using a wind farm controller;
   generating individual storage power set points for a plurality of energy storage elements using the wind farm controller, wherein each of the plurality of energy storage elements is coupled to a corresponding wind turbine of a plurality of wind turbines, and wherein the individual storage power set points are generated based on states of charge of respective energy storage elements; and
   controlling the plurality of energy storage elements based on the individual storage power set points for dispatching storage power to perform automatic generation control based on an aggressive optimal dispatch method, wherein dispatching the storage power based on the aggressive optimal dispatch method comprises prioritizing a storage power dispatch from the plurality of energy storage elements based on charging coefficients and discharging coefficients in a descending order, wherein the charging coefficients are represented as:

$$\alpha_i = \frac{1 - SOC_i(t-1)}{\sum_{i=1}^{N} 1 - SOC_i(t-1)}$$

wherein $SOC_i$ represents a state of charge of an energy storage element 'i' of the plurality of energy storage elements, $(t-1)$ represents a previous time interval with respect to a time interval "t," and N represents a number of energy storage elements of the plurality of energy storage elements.

2. The method of claim 1, further comprising, prior to receiving the automatic generation control set point, generating a farm-level base point power forecast for the wind farm.

3. The method of claim 2, wherein generating the farm-level base point power forecast comprises generating a farm-level aero power forecast and a farm-level forecast adjustment.

4. The method of claim 3, wherein generating the farm-level aero power forecast comprises adding a plurality of turbine-level aero power forecasts received from a plurality of wind turbine controllers of respective wind turbines and generating the farm-level forecast adjustment comprises computing an average state of charge of the plurality of energy storage elements.

5. The method of claim 1, wherein generating the individual storage power set points based on the states of charge of the respective energy storage elements further comprises balancing the states of charge of the plurality of energy storage elements.

6. The method of claim 5, wherein balancing the states of charge of the plurality of energy storage elements comprises equalizing the states of charge of the plurality of energy storage elements.

7. The method of claim 1, wherein the charging coefficients and discharging coefficients are determined based on a state of charge corresponding to each of the plurality of energy storage elements.

8. The method of claim 1, wherein the discharging coefficients are represented as $$\beta_i = \frac{SOC_i(t-1)}{\sum_{i=1}^{N} SOC_i(t-1)}.$$

9. A system for automatic generation control in a wind farm comprising:
   a plurality of wind turbines;
   a plurality of energy storage elements, wherein each of the plurality of energy storage elements is integrated within or coupled to a corresponding wind turbine of the plurality of wind turbines;
   a wind farm controller for controlling the plurality of energy storage elements, wherein the wind farm controller is configured for executing the steps of:
   receiving an automatic generation control set point from an independent system operator;
   generating a farm-level storage power set point for the wind farm based on the automatic generation control set point;
   generating individual storage power set points for the plurality of energy storage elements based on states of charge of respective energy storage elements; and controlling the plurality of energy storage elements based on the individual storage power set points for dispatching storage power to perform automatic generation control based on an aggressive optimal dispatch method, wherein dispatching the storage power based on the aggressive optimal dispatch method comprises prioritizing a storage power dispatch from the plurality of energy storage elements based on charging coefficients and discharging coefficients in a descending order, wherein the charging coefficients are represented as:

$$\alpha_i = \frac{1 - SOC_i(t-1)}{\sum_{i=1}^{N} 1 - SOC_i(t-1)}$$

wherein $SOC_i$ represents a state of charge of an energy storage element 'i' of the plurality of energy storage elements, (t−1) represents a previous time interval with respect to a time interval "t," and N represents a number of energy storage elements of the plurality of energy storage elements.

10. The system of claim 9, further comprising wind turbine controllers for generating a plurality of turbine-level aero power forecasts for the plurality of wind turbines.

11. The system of claim 9, wherein the farm-level storage power set point is further generated based on a wind farm error.

12. The system of claim 11, wherein the wind farm controller computes a wind farm error based on the farm-level base point power forecast and a measured base point power.

13. The system of claim 9, wherein the individual storage power set points are generated to balance the states of charge of the plurality of energy storage elements.

14. The system of claim 9, wherein automatic generation control set point comprises a grid frequency control set point and a tie-line power set point.

15. The system of claim 9, wherein the charging coefficients and discharging coefficients are determined based on a state of charge corresponding to each of the plurality of energy storage elements.

16. The system of claim 9, wherein the discharging coefficients are represented as $$\beta_i = \frac{SOC_i(t-1)}{\sum_{i=1}^{N} SOC_i(t-1)}.$$

* * * * *